May 3, 1955     T. H. GEWECKE     2,707,547
CONTAINER-ORIENTING MECHANISM
Filed Feb. 1, 1954
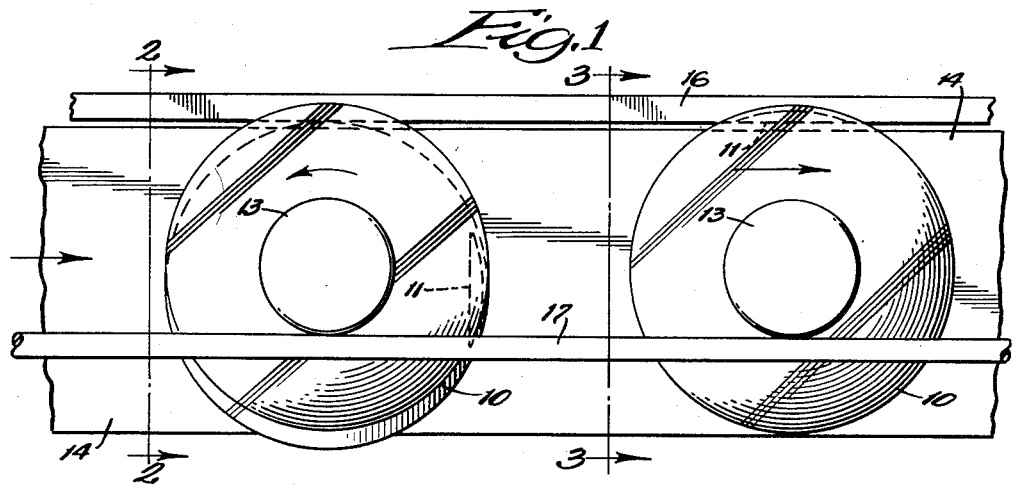
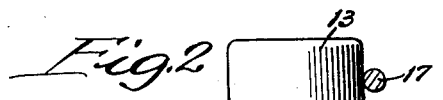 
INVENTOR:
Theodore H. Gewecke,
BY
Dawson, Tilton & Graham
ATTORNEYS.

United States Patent Office 2,707,547
Patented May 3, 1955

2,707,547

CONTAINER-ORIENTING MECHANISM

Theodore H. Gewecke, Glenview, Ill., assignor to Baxter Laboratories, Inc., Morton Grove, Ill., a corporation of Delaware Application February 1, 1954, Serial No. 407,224

4 Claims. (Cl. 198—33)

This invention pertains to an orienting mechanism for containers and, more particularly, to a mechanism for orienting containers preparatory to labeling.

In the past, manufacturers of containers, and more particularly bottled goods, have had difficulty in automatically orienting the bottles properly so as to apply labels to a predetermined portion of the bottle. In some instances, it is necessary that the labels be applied to the container so as not to mask certain other portions of the container. In particular, the manufacturers of pharmaceutical solutions must position labels on the containers so as not to mask graduations which are molded into the wall of the container.

I have invented a new and useful mechanism for orienting such containers for labeling which is inexpensive to produce and install, and simple to operate. Devices known to the art to solve this problem in the past have been intricate, cumbersome and expensive.

In the preferred form, my invention includes a conveyor for laterally transporting the containers to be oriented, each container being provided with a spotting recess. Mounted on the frame of the conveyor is a guide member so positioned with respect to the conveyor as to engage the spotting recess of the container when the container is properly oriented for labeling. Also mounted on the frame of the conveyor is a spotting member or friction rail so positioned with respect to the guide member and the conveyor as to cause a slight tilting and rotation of the container whenever the guide member is not in engagement with the spotting recess of the container.

My invention will be explained in conjunction with the following drawings, in which—

Fig. 1 is a plan view of the orienting mechanism and shows one container oriented and one container slightly tilted preparatory to being properly oriented for labeling;

Fig. 2 is an elevational view taken along the line 2—2 of Fig. 1 and showing a container in a tilted position;

Fig. 3 is an elevational view taken along line 3—3 of Fig. 1 and showing a container properly oriented for application of a label to the predetermined portion of the container.

Referring to the attached drawings, numeral 10 generally designates a container which is to be oriented for labeling. The container 10 may be of generally bell-shaped construction as shown and in the preferred embodiment is constructed of glass. However, the container may be of any design and construction and still be properly oriented by my invention. It includes a circular body portion 10a, a spotting recess 11, a neck portion 12, and a closure 13 for the neck portion 12. The spotting recess 11 is essentially an indented portion, preferably adjacent the base of the container, and can be readily formed during the molding of the container.

The container is supported by a conveyor 14 which is adapted to travel in a lateral fashion. Thus, the conveyor 14 travels in a horizontal plane and the axis of the container 10 is in a vertical plane. The conveyor 14 may be of any conventional type known to the art suitable for transporting containers laterally, since the form of the conveyor as such is not part of this invention.

The conveyor 14 is movably mounted on a supporting frame (not shown) which, again, may be of any suitable arrangement known to those skilled in the art since, again, the arrangement of the frame of the conveyor is not part of this invention.

Stationary guide member 16 is supported adjacent conveyor 14 by any suitable means. The guide member 16 is so located with respect to the conveyor 14 that it may engage the spotting recess 11 of container 10. Therefore, guide member 16 is located immediately above conveyor 14 at a distance approximately equal to that between the spotting recess 11 and the base of container 10. An inexpensive form of guide member 16 may be made from bar stock of a size adapted to engage the spotting recess 11.

A spotting member 17 is located above conveyor 14 and extends parallel to the direction of conveyor travel. Spotting member 17 is located with respect to guide member 16 and conveyor 14 so that whenever the spotting recess 11 of container 10 is not in engagement with guide member 16, the spotting member 17 causes container 10 to tilt slightly and start to rotate. Container 10, in being carried laterally by conveyor 14, will continue to rotate about its axis, which is slightly inclined from vertical, until spotting recess 11 engages guide member 16. At this point the rotation and tilting ceases and the container is properly oriented for application of a label to the desired predetermined portion of the container.

In the event that it is necessary to apply a label to a certain portion of the container, the container can be oriented to such a position by locating the spotting recess 11 with respect to the labeling device so that the label will not mask the portion which is desired to be kept free of the label.

Referring particularly to Figs. 2 and 3 of the attached drawings, it is to be noted that a minimum of tilt is provided when the spotting member is so positioned with respect to conveyor 14 as to cause the closure 13 on neck portion 12 to bear against spotting member 17. It is important to note that the less the tilt, as achieved by positioning the spotting member so as to bear against the smaller diameter closure, the less chance there is for the container to fall forward or backward on the conveyor. It will be understood, however, that the spotting member may be positioned at various elevations above the conveyor while performing the function described above.

By extending the rails past the point where labels are applied, I am able to overcome the disadvantage of many previous orienting mechanisms which permitted the container to rotate after orienting but just before labeling, which then caused the label to be improperly registered with the predetermined portion of the container.

The foregoing detailed description has been given for clearness of understanding only, and no unnecessary limitations are to be understood therefrom as modifications will be obvious to those skilled in the art.

I claim:

1. A container-orienting mechanism for orienting a container having an external spotting recess, comprising means for longitudinally conveying said container, guide means adapted to engage said external spotting recess, and a longitudinally disposed member in spaced relation to said conveying means and said guide means, said member being adapted to tilt and rotate said container, said guide means being adapted upon proper orientation of said container to stop the rotation thereof by engagement with said external spotting recess.

2. A container-orienting mechanism adapted for use with a container having a spotting recess in its side wall, comprising means for longitudinally conveying the said container, a stationary spotting member above said conveying means, and a stationary guide member above said conveying means adapted to engage said spotting recess, said spotting member being in such spaced relation to said guide member and said conveying means to provide tilting and rotation of the said container about its axis whenever the guide member is not in engagement with said spotting recess.

3. A container-orienting mechanism adapted for use with a container having a spotting recess in its side wall, comprising a conveyor supported for movement and adapted to longitudinally convey the said container, a guide member mounted adjacent the said conveyor and parallel to the direction of travel of the conveyor, said stationary guide member being in such spaced relationship to said conveyor as to engage the spotting recess of the said container when the container is being conveyed by said conveyor means, a stationary spotting member supported above the said conveyor and parallel to the direction of travel of said conveyor, said spotting member being in such spaced relation to the said conveyor and the said guide member as to provide tilting and rotation of the said container whenever the guide member is not in engagement with the said spotting recess.

4. The mechanism of claim 3 wherein the container is a bottle having a reduced neck portion and wherein the said spotting member is located above the said conveyor a distance sufficient to permit the neck portion of said bottle to bear against said spotting member.

References Cited in the file of this patent

UNITED STATES PATENTS

| 2,159,318 | Carter | May 23, 1939 |
| 2,368,350 | Ellison | Jan. 30, 1945 |

FOREIGN PATENTS

| 655,271 | Germany | Jan. 12, 1938 |